United States Patent
Huang et al.

(10) Patent No.: US 12,540,274 B2
(45) Date of Patent: Feb. 3, 2026

(54) ELECTROCHROMIC COMPOSITION AND ELECTROCHROMIC DEVICE

(71) Applicant: TAI YING OPTRONICS CO., LTD., Taichung (TW)

(72) Inventors: Hao-Ping Huang, Taichung (TW); Tsung-Hsien Lin, Taichung (TW); Yu-Nan Lee, Taichung (TW)

(73) Assignee: TAI YING OPTRONICS CO., LTD., Taichung (TW)

( * ) Notice: Subject to any disclaimer, the term of this patent is extended or adjusted under 35 U.S.C. 154(b) by 131 days.

(21) Appl. No.: 18/742,114

(22) Filed: Jun. 13, 2024

(65) Prior Publication Data

US 2025/0136861 A1   May 1, 2025

(30) Foreign Application Priority Data

Oct. 30, 2023   (TW) .................. 112141462

(51) Int. Cl.
| | |
|---|---|
| *C09K 9/02* | (2006.01) |
| *G02F 1/1516* | (2019.01) |
| *G02F 1/1523* | (2019.01) |

(52) U.S. Cl.
CPC ............. *C09K 9/02* (2013.01); *G02F 1/1516* (2019.01); *G02F 1/1525* (2013.01); *C09K 2211/1029* (2013.01); *C09K 2211/1051* (2013.01)

(58) Field of Classification Search
CPC ............. C09K 9/02; C09K 2211/1029; C09K 2211/1051; G02F 1/1516; G02F 1/1525
See application file for complete search history.

(56) References Cited

U.S. PATENT DOCUMENTS

| | | |
|---|---|---|
| 10,787,446 B2 | 9/2020 | Bergeron |
| 10,921,673 B2 | 2/2021 | He |
| (Continued) | | |

FOREIGN PATENT DOCUMENTS

| | | |
|---|---|---|
| CN | 108290881 A | 7/2018 |
| CN | 109791340 A | 5/2019 |
| (Continued) | | |

OTHER PUBLICATIONS

Chinese language office action dated Jun. 17, 2024, issued in application No. TW 112141462.

*Primary Examiner* — Bijan Ahvazi
(74) *Attorney, Agent, or Firm* — McClure, Qualey & Rodack, LLP

(57) ABSTRACT

An electrochromic composition is provided, including: a first oxidizable compound with a concentration range of 0.01M-0.5M; a reducible compound with a concentration range of 0.01M-0.5M; an electrolyte with a concentration range of 0.01M-0.5M; and a solvent, wherein the first oxidizable compound is represented by the following formula:

wherein $X_1$, $X_2$ and $X_3$ are independently the same or different substituted or unsubstituted aromatic hydrocarbon group, wherein the aromatic hydrocarbon group includes the groups represented by the following formulas:

(Continued)

-continued

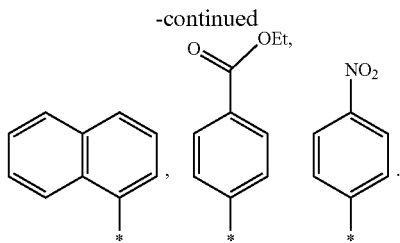

12 Claims, 5 Drawing Sheets (56) References Cited

U.S. PATENT DOCUMENTS

2014/0240652 A1* 8/2014 Satoh .................. G09F 9/35
                                                            359/290
2024/0045298 A1    2/2024  Biver

FOREIGN PATENT DOCUMENTS

| CN | 112300091 A | * | 2/2021 | ......... C07D 285/135 |
|----|-------------|---|--------|------------------------|
| CN | 114895498 A |   | 8/2022 |                        |
| CN | 116023633 A |   | 4/2023 |                        |
| CN | 116783545 A |   | 9/2023 |                        |

* cited by examiner

ELECTROCHROMIC COMPOSITION AND ELECTROCHROMIC DEVICE

CROSS REFERENCE TO RELATED APPLICATIONS

This Application claims priority of Taiwan Patent Application No. 112141462, filed on Oct. 30, 2023, the entirety of which is incorporated by reference herein.

BACKGROUND OF THE INVENTION

Field of the Invention

The present invention relates to an electrochromic composition, and, in particular, to electrochromic compositions of triphenylamine derivatives and their applications.

Description of the Related Art

Electrochromism is a phenomenon in which the optical properties (reflectivity, transmittance, absorptivity, etc.) of materials undergo stable and reversible color changes under the action of an external electric field, and it is manifested as reversible changes in color and transparency in appearance.

In current research into electrochromism, there are two major categories of electrochromic materials: inorganic materials such as transition metal oxides and Prussian blue; and organic materials such as organic compounds and polymers. Due to the requirements on the lifespan and durability of electrochromic materials, inorganic oxides are mostly used. However, since the formation of inorganic oxides mostly relies on coating methods which require expensive equipment such as vacuum evaporation, spray thermal decomposition, and sputtering, the production cost is high. In addition, inorganic oxides also have disadvantages such as slow color changing and relatively monotonous electrochromic tone. In contrast, electrochromic organic materials are mostly conjugated molecules, which have the advantages of multiple color choices and fast color changing. However, organic conjugated molecules also have shortcomings, such as insufficient thermal stability and short lifespans.

In summary, new electrochromic materials simultaneously meet the requirements of high reliability, high thermal stability, and long lifespan are called for.

BRIEF SUMMARY OF THE INVENTION

An embodiment of the present invention provides an electrochromic composition. The electrochromic composition includes a first oxidizable compound with a concentration range of 0.01M-0.5M; a reducible compound with a concentration range of 0.01M-0.5M; an electrolyte with a concentration range of 0.01M-0.5M; and a solvent, wherein the first oxidizable compound is represented by the following formula:

wherein $X_1$, $X_2$ and $X_3$ are independently the same or different substituted or unsubstituted aromatic hydrocarbon group, wherein the aromatic hydrocarbon group includes the groups represented by the following formulas:

In addition, an embodiment of the present invention provides an electrochromic device. The electrochromic includes a first transparent substrate, a second transparent substrate, an adhesive spacer, and an electrochromic composition. The first transparent substrate has a first transparent conductive layer on one of its surfaces. The second transparent substrate has a second transparent conductive layer on one of its surfaces, wherein the first transparent conductive layer is disposed opposite to the second transparent conductive layer. The adhesive spacer is bonded between the first transparent conductive layer and the second transparent conductive layer, so that a closed space is formed among the first transparent substrate, the second transparent substrate, and the adhesive spacer. The electrochromic composition is filled into the closed space, wherein the electrochromic composition includes the aforementioned electrochromic composition.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The electrochromic composition and the device thereof of the present disclosure are described in detail below. In the following detailed description, for purposes of explanation, numerous specific details and examples are set forth in order to provide a thorough understanding of the present disclosure. In the following detailed description, specific elements and arrangements are set forth in order to clearly describe the present disclosure. It is apparent, however, that the exemplary embodiments set forth herein are only for illustrative purposes, and the inventive concept may be implemented in various forms without being limited to these exemplary embodiments.

In the field of electrochromism, triphenylamine is the most widely used oxidizing material. Triphenylamine is a propeller-shaped molecule with easily oxidizable property, superior electrical activity and photoactivity. The above advantages make it a very good electron donor and hole transport material and thus is widely used in optoelectronic components. However, triphenylamine still has shortcomings such as insufficient thermal stability and short lifespan. Therefore, the present disclosure modifies the structure of triphenylamine by introducing a thiadiazole structure to improve its reliability in operating at high temperatures.

An electrochromic composition is provided in the present disclosure, including: a first oxidizable compound; a reducible compound; an electrolyte; and a solvent, wherein the first oxidizable compound is represented by the following formula:

wherein $X_1$, $X_2$ and $X_3$ are independently the same or different substituted or unsubstituted aromatic hydrocarbon group, wherein the substituted or unsubstituted aromatic hydrocarbon group may be a substituted or unsubstituted phenyl group, a substituted or unsubstituted naphthyl group, a substituted or unsubstituted biphenyl group, a substituted or unsubstituted heterocyclic group, etc., may include but not limited to the groups represented by the following formula:

"Substituted" as used herein refers to a moiety having substituents replacing hydrogen on one or more carbons or heteroatoms of the structure. It is understood that "substitution" or "substituted" includes the implicit condition that such substitution is based on the permissible valences of the substituted atoms and substituents, and that the substitution results in a stable compound that is, for example, does not undergo transformation spontaneously by rearrangement, cyclization, elimination, etc. "Substituted" as used herein is intended to include all permissible substituents of organic compounds. It will be understood by those skilled in the art that the substituents may themselves be substituted when appropriate. Unless specifically stated as "unsubstituted", chemical references herein should be understood to include substituted variants. For example, references to "aromatic" groups or moieties implicitly include both substituted and unsubstituted variants. It should be noted that "substituted" in this case also includes the meaning of being substituted with a heteroatom, or interposed by a heteroatom, etc.

The "aromatic hydrocarbon group" as used herein includes a monocyclic aromatic hydrocarbon group or a fused polycyclic aromatic hydrocarbon group, such as a $C_6$-$C_{30}$ aromatic hydrocarbon group. Examples of aromatic hydrocarbon group include, but not limited to, a phenyl group, a naphthyl group, an anthracenyl group, a phenanthrenyl group and an acenaphthyl group. "Substituted aromatic hydrocarbon group" refers to the above-mentioned aromatic hydrocarbon group substituted by a specific group, radical or part, such as but not limited to the aromatic group mentioned above substituted by heteroatom, halogen, an alkyl group, an alkoxy group, a hydroxyl group, a carboxyl group, a ester group, a ketone group (oxo group), a thiol group, an alkylthio group, a cyano group, a nitro group, an amino group, an amide group, an aryl group, an aralkoxy group, an alkoxycarbonyl group, etc.

Aromatic hydrocarbon group may be, for example, aromatic hydrocarbon groups substituted by heteroatoms, an alkyl aromatic hydrocarbon group, a haloalkyl aromatic hydrocarbon group, an alkoxyaromatic hydrocarbon group, a halogenated aromatic hydrocarbon group, a cyanoaromatic hydrocarbon group, a cyanoaromatic hydrocarbon group, an alkoxycarbonyl aromatic hydrocarbon group, a nitrated aromatic hydrocarbon group, an amino aromatic hydrocarbon group, etc.

The aromatic hydrocarbon groups substituted by heteroatoms may be, for example, a pyridyl group, a pyrimidinyl group, a pyridazinyl group, a pyrazinyl group, a quinolinyl group, an isoquinolinyl group, a quinoxalinyl gourp, a quinazolinyl group, a cinnolinyl group, a benzocyclobutenyl group, a benzofuranyl group, an isobenzofuranyl group, an indolyl group, an isoindolyl group, a benzothienyl group, a benzimidazolyl group, a purinyl group, an indazolyl group, a benzoxazolyl group, a benzisoxazolyl group, a benzothiazolyl group, a benzotriazolyl group, a dibenzothienyl group, an acridinyl group, etc.

The alkyl aromatic hydrocarbon group may be, for example, a alkylphenyl group such as tolyl, ethylphenyl, xylenyl, propylphenyl, mesityl, methylethylphenyl, cumyl, butylphenyl, isobutylphenyl, tert-butylphenyl; an alkylnaphthyl group such as methylnaphthyl, ethylnaphthyl, dimethylnaphthyl, propylnaphthyl, trimethylnaphthyl, methylethylnaphthyl, isopropylnaphthyl, butylnaphthyl, isobutylnaphthyl, ter-butylnaphthyl, etc.

The haloalkyl aromatic hydrocarbon group may be, for example, a haloalkylphenyl group such as trifluoromethylphenyl, difluoromethylphenyl, fluoromethylphenyl, pentafluoroethylphenyl, tetrafluoroethylphenyl, trifluoroethylphenyl, difluoroethylphenyl, fluoroethylphenyl, trichloromethylphenyl, dichloromethylphenyl, chloromethylphenyl, pentachloroethylphenyl, tetrachloroethylphenyl, trichloroethylphenyl, dichloroethylphenyl, chloroethylphenyl, etc.

The alkoxyaromatic hydrocarbon group may be, for example, an alkoxyphenyl group such as methoxyphenyl, dimethoxyphenyl, trimethoxyphenyl, ethoxyphenyl, diethoxyphenyl, triethoxyphenyl, propoxyphenyl, butoxyphenyl, pentoxyphenyl; an alkoxynaphthyl group such as methoxynaphthyl, dimethoxynaphthyl, ethoxynaphthyl, etc.

The halogenated aromatic hydrocarbon group may be, for example, a halophenyl group such as chlorophenyl, bromophenyl, fluorobenzene, dichlorophenyl, dibromophenyl, pentachlorophenyl, pentabromophenyl, pentafluorophenyl, etc.

The cyanoaromatic hydrocarbon group may be, for example, a cyanophenyl group such as monocyanophenyl, dicyanophenyl, tricyanophenyl, etc.

The alkoxycarbonyl aromatic hydrocarbon group may be, for example, an alkoxycarbonylphenyl group such as methoxycarbonylphenyl, ethoxycarbonylphenyl, propoxycarbonylphenyl, etc.

The nitrated aromatic hydrocarbon group may be, for example, a nitrophenyl group, a nitronaphthalenyl group, a nitrohenanthrenyl group, etc.

The amino aromatic hydrocarbon group may be, for example, an aminophenyl group such as monoaminophenyl, diaminophenyl, ethylaminophenyl, diethylaminophenyl, triaminophenyl; an aminonaphthalenyl group such as monoaminonaphthyl, ethylaminonaphthyl; etc.

"Alkyl" as used herein includes linear alkyl, branched alkyl and cyclic alkyl. Examples of linear alkyl include, but not limited to methyl, ethyl, n-propyl, n-butyl, n-pentyl, n-hexyl, n-heptyl, n-octyl, etc. Examples of branched alkyl include, but not limited to isopropyl, isobutyl, tert-butyl, sec-butyl, 2-methylbutyl, sec-pentyl, neopentyl, neohexyl, 2-ethylhexyl, etc. Examples of cyclic alkyl include, but not limited to cyclopropyl, cyclopentyl, cyclohexyl, cycloheptyl, cyclooctyl, etc. Unless otherwise specified, the abbreviation "Me" used in the chemical formulas herein refers to a methyl group, and the abbreviation "Et" refers to an ethyl group.

In some embodiments, the first oxidizable compound can be prepared by the following method, as shown in Formula 1. Mix an appropriate amount of aminothiadiazole compound, halogenated aromatic hydrocarbon and sodium tert-butoxide in a reaction flask. Add toluene into the reaction flask as solvent, then add palladium metal complex and tri-tert-butylphosphine as catalyst into the reaction flask, heat the mixture in the reaction flask to 100° C.~150° C. while stirring, and cool it to room temperature after one day of reaction. Filter the reaction product and extract it by water twice. After taking the organic layer and removing the water, collect the liquid and concentrate it under reduced pressure until completely dry. Add ethanol to precipitate the solid. Collect the solid, and rinse and dry it to obtain the oxidizable compound to be synthesized.

[Formula 1]

Wherein, in Formula 1, $Y_1$, $Y_2$ and $Y_3$ may be the substituted or unsubstituted aromatic hydrocarbon groups described above independently, and $Y_1$, $Y_2$ and $Y_3$ may be the same or different.

According to some embodiments of the present disclosure, the reducible compound includes, but not limited to viologen compound or a combination thereof, etc. In some embodiments, the viologen compound is an alkyl viologen, such as hexyl viologen, heptyl viologen, or octyl viologen, etc. In some embodiments, the reducible compound is wherein $R_1$ is, for example, a C1-C16 optionally substituted alkyl group.

According to some embodiments of the present disclosure, the concentration range of the first oxidizable compound in the electrochromic composition is 0.01M-0.5M, such as 0.03M-0.46M, 0.06M-0.41M, 0.09M-0.36M, 0.12M-0.31M, 0.15M-0.26M, 0.18M-0.21M. According to some embodiments of the present disclosure, the concentration range of the reducible compound is 0.01M-0.5M, such as 0.03M-0.46M, 0.06M-0.41M, 0.09M-0.36M, 0.12M-0.31M, 0.15M-0.26M, 0.18M-0.21M. In some embodiments, the molar ratio of the first oxidizable compound to the reducible compound is 1:0.01 to 1:50, for example, 1:0.04 to 1:46, 1:0.09 to 1:41, 1:0.14 to 1:36, 1:0.19 to 1:31, 1:0.21 to 1:28, 1:0.26 to 1:26, 1:0.31 to 1:21, 1:0.36 to 1:16, 1:0.41 to 1:11. 1:0.46 to 1:5, 1:0.51 to 1:4, 1:0.56 to 1:3, 1:0.61 to 1:2, 1:0.66 to 1:1, 1:0.71 to 1:0.9, 1:0.76 to 1:0.85.

According to some embodiments of the present disclosure, the electrolyte includes a lithium salt, an amine salt, a tetraalkylammonium salt, and/or an imidazolium salt. In some embodiments, the lithium salt includes $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)$, $LiSCN$, $LiN(SO_2CF_3)_2$, $LiO_3SCF_2CF_3$, $LiC_6F_5SO_3$, $LiO_2CCF_3$, $LiSO_3F$, $LiB(C_6H_5)$, $LiCF_3SO_3$, or a combination thereof, etc. In some embodiments, the amine salt includes trifluoromethanesulfonimide salt, dicyanamide salt, ammonium tetrafluoroborate salt, ammonium tetrachloroaluminate salt, ammonium hexafluorophosphate salt, halogen ammonium salt or a combination thereof, etc. In some embodiments, the tetraalkylammonium salt includes tetraalkylammonium bromide, tetraalkylammonium perchlorate, tetraalkylammonium tetrafluoroborate, or a combination thereof, etc. In some embodiments, the imidazolium salt includes alkylimidazolium trifluoromethanesulfonate, alkylimidazolium tetrafluoroborate, alkylimidazolium tetrachloroaluminate, alkylimidazolium halide salt, or a combination thereof, etc. In some embodiments, the concentration range of the electrolyte in the electrochromic composition is 0.01M-5M, such as 0.03M-4.6M, 0.06M-4.1M, 0.09M-3.6M, 0.12M-3.1M, 0.15M-2.6M, 0.18M-2.1M, 0.21M-1.6M, 0.26M-1.1M, 0.31M-0.9M, 0.36M-0.86M, 0.41M-0.81M, 0.46M-0.76M, 0.51M-0.71M, 0.56M-0.66M, 0.05M-0.5M.

The solvent includes all solvents that are inert to redox at the selected voltage and are not capable of dissociating to form electrophiles or nucleophiles, or do not themselves act as strong enough electrophiles or nucleophiles, and thus do not react with colored ionic radicals. According to some embodiments of the present disclosure, the solvent includes propylene carbonate, acetonitrile, γ-butyrolactone, ethylene carbonate, sulfolane, dioxolane, tetrahydrofuran, 2-methyltetrahydrofuran, dimethyl sulfoxide, dimethoxyethane, ethoxymethoxyethane, polyethylene glycol and alcohol (such as alkyl alcohol, and example includes isobutyl alcohol, n-octanol, etc.), or a combination thereof.

According to some embodiments of the present disclosure, the electrochromic composition may further include a second oxidizable compound that is different from the first oxidizable compound. The second oxidizable compound includes:

or a combination thereof, etc., wherein $R_2$ may be, for example, hydrogen or an optionally substituted alkyl group. In some embodiments, the concentration range of the second oxidizable compound in the electrochromic composition is 0.01M-0.5M, such as 0.03M-0.46M, 0.06M-0.41M, 0.09M-0.36M, 0.12M-0.31M, 0.15M-0.26M, 0.18M-0.21M. In some embodiments, the molar ratio of the first oxidizable compound to the second oxidizable compound is 1:0.01 to 1:50, for example, 1:0.04 to 1:46, 1:0.09 to 1:41, 1:0.14 to 1:36, 1:0.19 to 1:31, 1:0.21 to 1:28, 1:0.26 to 1:26, 1:0.31 to 1:21, 1:0.36 to 1:16, 1:0.41 to 1:11, 1:0.46 to 1:5, 1:0.51 to 1:4, 1:0.56 to 1:3, 1:0.61 to 1:2, 1:0.66 to 1:1, 1:0.71 to 1:0.9, 1:0.76 to 1:0.85.

According to some embodiments of the present disclosure, the electrochromic composition may further include UV absorbers (for example: benzoates, salicylates, benzophenones, benzotriazole, cinnamate esters, triazines, oxalamides, etc.), UV blockers (for example, derivatives of tetramethylpiperidine (2,2,6,6-tetramethylpiperidine) structure, etc.), IR blockers (for example, tungsten bronzes (chemical formula: $M_xWO_3$, wherein M=Li, Na, K, Rb or Cs, etc.), IR absorbers (for example, derivatives of nitrogen-containing aniline, etc.), or a combination thereof, and the respective concentration range of the additive mentioned before is 0.01M-5M, such as 0.03M-4.6M, 0.06M-4.1M, 0.09-3.6M, 0.12M-3.1M, 0.15M-2.6M, 0.18M-2.1M, 0.21M-1.6M, 0.26M-1.1M, 0.31M-0.9M, 0.36M-0.86M, 0.41M-0.81M, 0.46M-0.76M, 0.51M-0.71M, 0.56M-0.66M, 0.05M-0.5M.

If the concentration of each of the above substances is too high, it may cause precipitation of the substance in the solvent, or cracking and damage of the substance at high temperature; if the concentration is too low, it may cause chromism of the electrochromic device to fail.

In some embodiments, the electrochromic composition further includes polymers, such as alkyd resins, acrylic resins, acrylamide resins, polyester resins, styrene resins, phenol formaldehyde resins, melamine resins, epoxy resins, polyurethane resins, nylon resins, polycarbonate, polyimide or a combination thereof. By adding polymers to the electrochromic composition, the electrochromic composition can be made into colloidal state or solid state, improving its safety in the utilization, which in turn make it suitable for being applied in different fields such as energy-saving smart windows, car sunroofs, anti-glare mirrors, e-paper, electronic labels, and so on.

Figure 1:
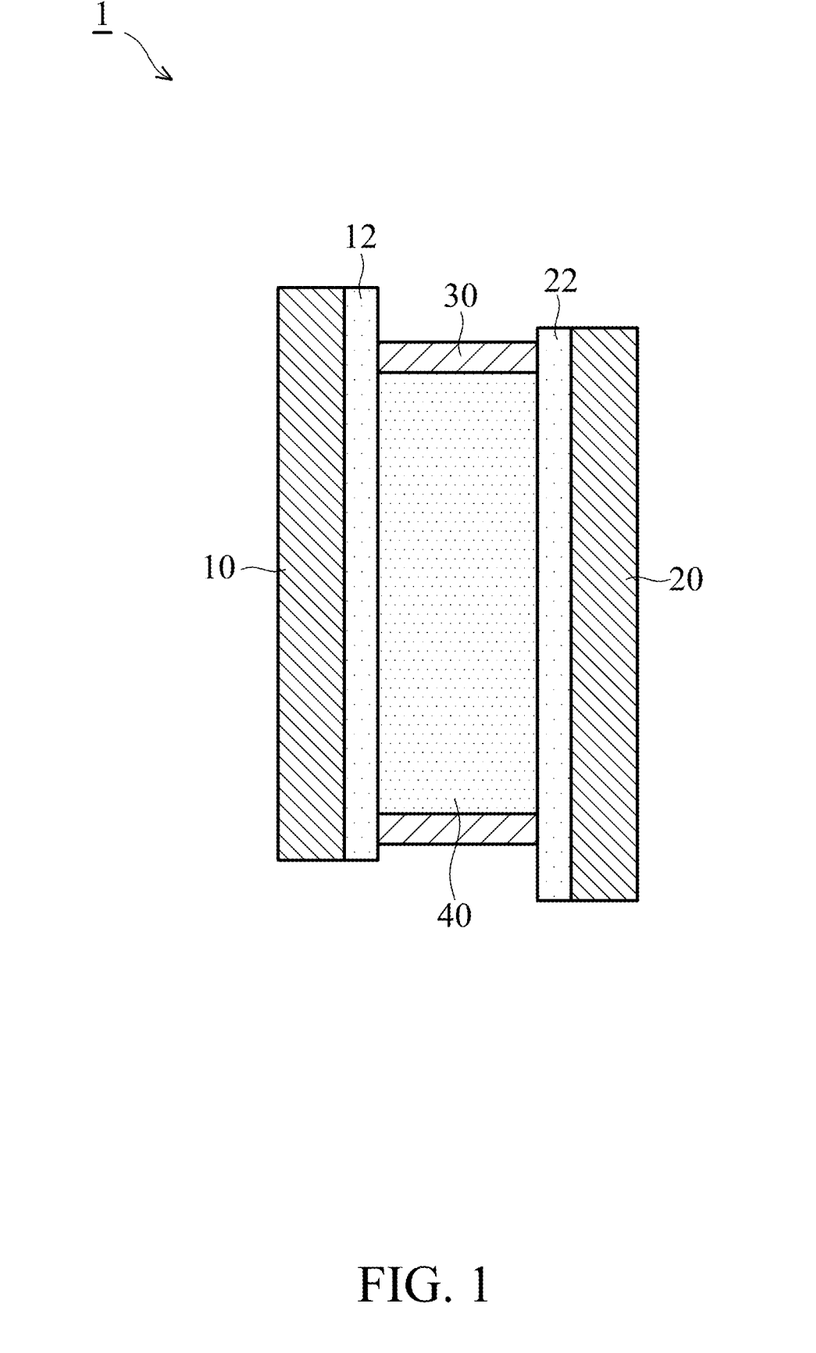
FIG. 1 shows an electrochromic device according to an embodiment of the present disclosure.

In some embodiments of the present disclosure, the electrochromic composition mentioned above is used to form an electrochromic device. Referring to FIG. 1, in some embodiments, a pair of electrodes of an electrochromic device 1 includes a first transparent conductive layer 12 on a surface of a first transparent substrate 10, and a second transparent conductive layer 22 on a surface of a second transparent substrate 20. Wherein, the first transparent conductive layer 12 is disposed opposite to the second transparent conductive layer 22. An adhesive spacer 30 is bonded between the first transparent conductive layer 12 and the second transparent conductive layer 22 to bond the pair of electrodes, and a closed space is formed between the pair of electrodes and the adhesive spacer 30. Next, electrochromic composition 40 is filled into the space among the first transparent conductive layer 12, the second transparent conductive layer 22, and the adhesive spacer 30 through the remaining hole in the adhesive spacer 30, and then the hole is sealed to form the electrochromic device 1.

In some embodiments, the first transparent substrate 10 and the second transparent substrate 20 may be made of glass or plastic (such as polycarbonate), and the first transparent conductive layer 12 and the second transparent conductive layer 22 may include, for example, indium tin oxide (ITO), antimony-doped tin oxide, fluorine-doped tin oxide (FTO), antimony-doped zinc oxide, aluminum-doped zinc oxide, tin oxide, etc. The adhesive spacer 30 may be obtained by blending a filler and a thermosetting or photo-chemically curable adhesive. The adhesive may be, for example, epoxy resins or acrylate resins. The filler may be, for example, plastic, glass beads, or certain sand powder.

The thickness of the adhesive spacer 30 (that is, the distance between the first transparent conductive layer 12 and the second transparent conductive layer 22) is between 1 μm and 300 μm, such as 3 μm-290 μm, 5 μm-280 μm, 10 μm-270 μm, 15 μm-260 μm, 20 μm-250 μm, 25 μm-240 μm, 30 μm-230 μm, 50 μm-200 μm, 60 μm-180 μm, 70 μm-160 μm, 80 μm-140 μm, 90 μm-120 μm, 95 μm-115 μm, or 100 μm-110 μm. If the distance between the transparent conductive layers is too small, current leakage and uneven color changing may occur. If the distance between the transparent conductive layers is too large, the reaction rate becomes slow. When the electrochromic device isn't connected to power, the electrochromic composition is transparent in its original neutral state. By applying a positive voltage to the electrochromic device, its color darkens gradually. Once the power is turned off, the electrochromic composition returns to its original transparent state in a short period of time (less than 1 second).

In order to make the above and other objects, features, and advantages of the present disclosure more obvious and understandable, several embodiments are described in detail below along with the accompanying drawings:

Example

Compound A1

5 g of 5-(4-methoxyphenyl)-1,3,4-thiadiazol-2-amine, 9.9 g of 1-bromo-4-methylbenzene and 6.9 g of sodium tert-butoxide were mixed in a reaction flask. 100 mL of toluene was added to the reaction flask as solvent. Then 0.4 g of palladium metal complex and 0.3 g of tri-tert-butylphosphine were added as catalyst to the reaction flask. The mixture in the reaction flask was heated to 110° C. while stirring, and cooled to room temperature after one day of reaction. The reaction product was filtered, then extracted by water twice. After taking the organic layer and removing the water, the liquid was collected and concentrated under reduced pressure until completely dry. Then ethanol was added to precipitate the solid. The solid was collected, rinsed and dried so as to obtain the beige white oxidizable compound A1. The above reaction is shown in Formula 2.

[Formula 2]

Compound A2

5 g of 5-(4-fluorophenyl)-1,3,4-thiadiazol-2-amine, 9.64 g of 1-bromo-4-methylbenzene and 7.38 g of sodium tert-butoxide were mixed in a reaction flask. 100 mL of toluene was added to the reaction flask as solvent. Then 0.37 g of palladium metal complex and 0.37 g of tri-tert-butylphosphine were added as catalyst to the reaction flask. The mixture in the reaction flask was heated to 110° C. while stirring, and cooled to room temperature after one day of reaction. The reaction product was filtered, and extracted by water twice. After taking the organic layer and removing the water, the liquid was collected and concentrated under reduced pressure until completely dry. Then ethanol was added to precipitate the solid. The solid was collected, rinsed and dried so as to obtain the beige white oxidizable compound A2. The above reaction is shown in Formula 3.

[Formula 3]

Compound A3

5 g of 5-(pyridin-4-yl)-1,3,4-thiadiazol-2-amine, 11.52 g of 1-bromo-4-methylbenzene and 8.09 g of sodium tert-butoxide were mixed in a reaction flask. 100 mL of toluene was added to the reaction flask as solvent. Then 0.32 g of palladium metal complex and 0.32 g of tri-tert-butylphosphine were added as catalyst to the reaction flask. The mixture in the reaction flask was heated to 110° C. while stirring, and cooled to room temperature after one day of reaction. The reaction product was filtered, and extracted by water twice. After taking the organic layer and removing the water, the liquid was collected and concentrated under reduced pressure until completely dry. Then ethanol was added to precipitate the solid. The solid was collected, rinsed and dried so as to obtain the beige white oxidizable compound A3. The above reaction is shown in Formula 4.

[Formula 4]

Compound B1

Compound B1, as a comparative example, does not contain a thiadiazole structure and is represented by the following chemical formula:

[Manufacturing of Electrochromic Device]

The manufacturing of the electrochromic device in the example of the present disclosure is described in detail below.

Device A1

Alkylammonium tetrafluoroborate salt was dissolved in gamma-butyrolactone (GBL) to form a 0.5M solution. The oxidizable compound (compound A1) and the reducible compound (octyl viologen) were dissolved in the above solution to form an electrochromic composition solution, wherein the concentration of the oxidizable compound A1 was 0.05M and the concentration of octyl viologen was 0.05M. Two pieces of ITO conductive glass were cut into suitable size, and an adhesive spacer (epoxy resin) was used to separate the glass with a gap of 100 μm which define the distance between the ITO conductive glasses, the electrochromic composition solution prepared above was filled in the space between the ITO conductive glass. The device was obtained after sealing.

Device A2-A3

The manufacturing methods of the devices A2-A3 were the same as device A1, except that 0.05M of the oxidizable compound A1 is replaced by 0.05M of the oxidizable compound A2-A3, respectively.

Device B1

As a comparative example, device B1 was manufactured in the same manner as device A1, except that 0.05 M of compound B1 is used instead of 0.05 M of oxidizable compound A1.

[High-Temperature Reliability Test]

In the present disclosure, the difference in transmittance before and after a high temperature is used as an index to evaluate the high-temperature reliability of each of the above devices. First, the transmission spectrum of the device was obtained in its neutral state at room temperature, and then a voltage of 1.2V was applied to the device to obtain the transmission spectrum of its colored state. Next, the device was placed at 85° C., a voltage of 1.2V (colored state) was applied to the device for 20 seconds, and then keep the state with 0V voltage (decolored state) was for 40 seconds. The above cycle was repeated. Afterwards, the device was cooled to room temperature to obtain the transmission spectrum in the neutral state after the high-temperature cycling. Then a 1.2V voltage is applied to obtain its transmission spectrum in the colored state after the high-temperature cycling.

Wherein, the transmission spectrum of the device was obtained in the following manner: UV-Vis spectrum of the device mentioned above was detected at room temperature using Agilent 8453 UV-Vis spectrometer with no electric connected to the device (neutral state) and with a 1.2V operating voltage applied to the device (colored state). After the device was powered on, the color changed due to the oxidation-reduction reaction between the oxidizable compound and the reducible compound in the electrochromic composition, resulting in a decrease in the transmittance of the device.

Below, the results of the high-temperature reliability test of the devices A1-A3 and B1 were analyzed.

Figure 2:
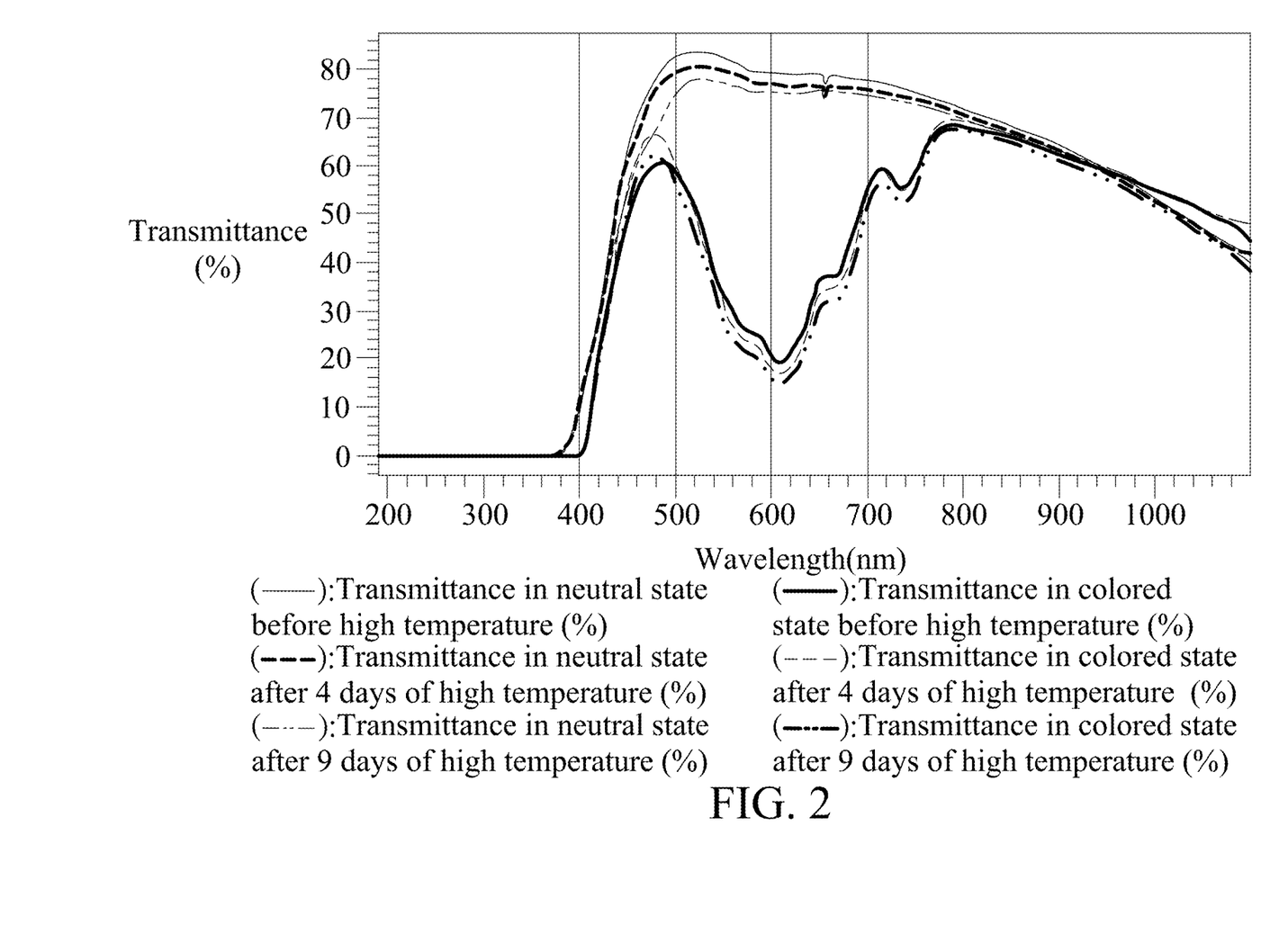
FIGS. 2-4 show the transmission spectra of devices A1-A3 in neutral and colored states according to some embodiments of the present disclosure.

The transmission spectrum of the device A1 is shown in FIG. 2, and the transmittance of different wavelengths in different states is shown in Table 1. According to the results of the experiment, it can be found that, before the high-temperature cycling, there was a significant difference between the transmittance in the neutral state and the colored state of the device A1 at wavelengths in the visible light range. The compound A1, as an example, has a good transmittance ratio (the ratio of the transmittance in the neutral state to the transmittance in the colored state) and is therefore suitable for the electrochromic field. Moreover, after the high-temperature cycling of device A1, there was no significant change in the transmittance in the neutral-state, and the difference of the transmittance in neutral-state (the absolute value of the difference between the transmittance in the neutral-state before and after the high-temperature cycling) did not exceed 10%, there was also no significant change in the transmittance in the colored state, and the difference of the transmittance in colored state (the absolute value of the difference between the transmittance in the colored state before and after the high-temperature cycling) was no more than 5%. Therefore, there was no significant difference in the transmittance contrast of device A1 before and after the high-temperature cycling, and compound A1 has good high-temperature reliability.

TABLE 1

| | 400 nm | 500 nm | 600 nm | 700 nm |
|---|---|---|---|---|
| Transmittance in neutral state before high temperature (%) | 10.12 | 82.31 | 79.22 | 77.66 |
| Transmittance in neutral state after 4 days of high temperature (%) | 9.61 | 79.11 | 76.95 | 75.66 |
| Transmittance in neutral state after 9 days of high temperature (%) | 9.66 | 74.78 | 75.35 | 74.74 |
| Difference of the transmittance in neutral state (%) | <1 | <7 | <4 | <3 |
| Transmittance in colored state before high temperature (%) | 0.05 | 58.46 | 20.639 | 54.892 |
| Transmittance in colored state after 4 days of high temperature (%) | 0.044 | 61 | 17.975 | 53.942 |
| Transmittance in colored state after 9 days of high temperature (%) | 0.025 | 56.99 | 15.94 | 51.07 |
| Difference of the transmittance in colored state (%) | <0.1 | <4 | <5 | <4 |

Figure 3:
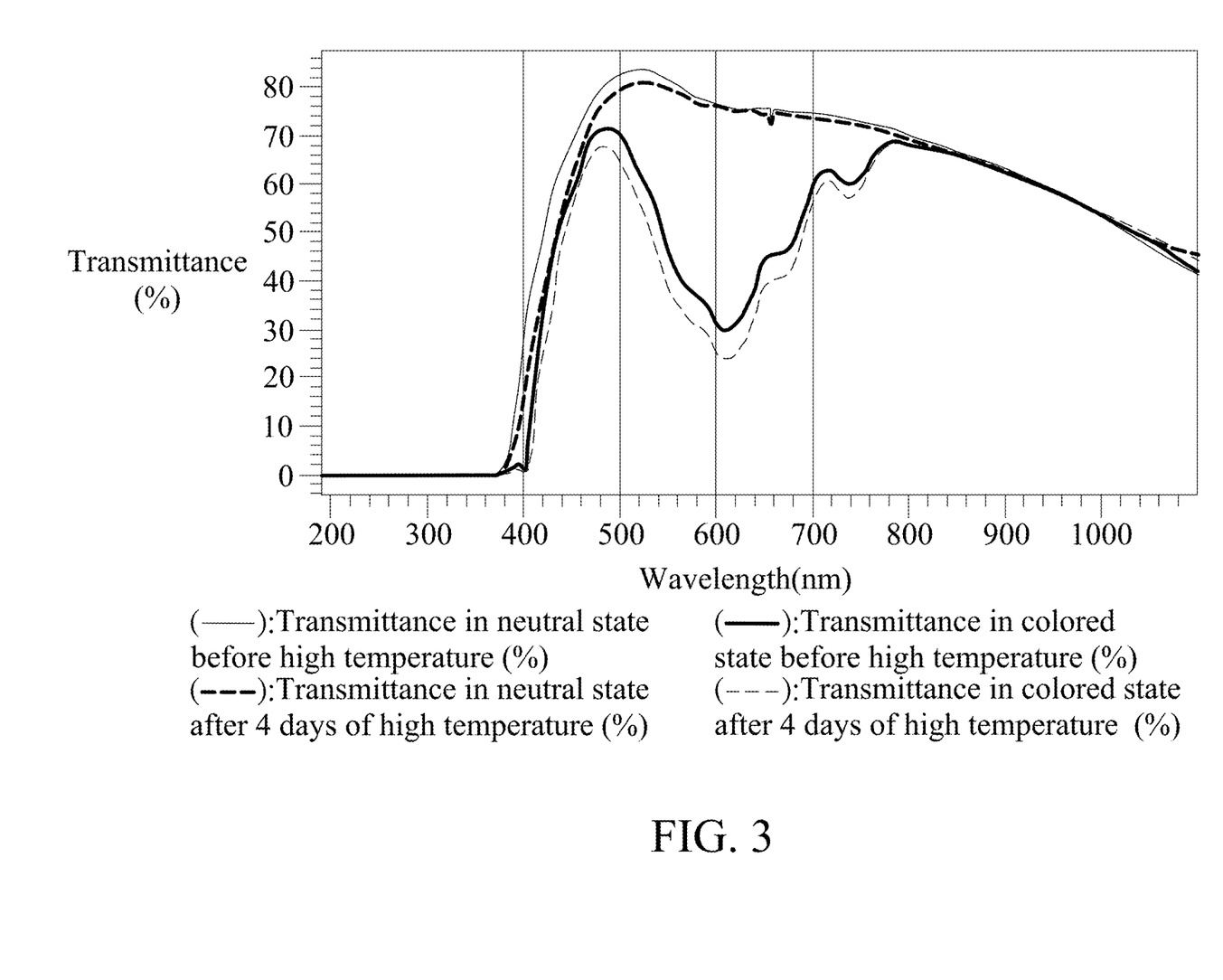

The transmission spectrum of device A2 is shown in FIG. 3, and the transmittances at different wavelengths in different states are shown in Table 2. From the results of the experiment, it can be found that, before the high-temperature cycling, there was a significant difference between the transmittance in the neutral state and the colored state of the device A2 at wavelengths in the visible light range. The compound A2, as an example, has a good transmittance contrast and is therefore suitable for the electrochromic field. Moreover, after the high-temperature cycling of device A2, there was no significant change in the transmittance in the neutral state, and the difference of the transmittance in the neutral state did not exceed 10%. There was also no significant change in the transmittance in the colored state, and the difference of transmittances in the colored state did not exceed 6%. Therefore, there was no significant difference in the transmittance contrast of device A2 before and after high-temperature cycling, and compound A2 has good high-temperature reliability.

TABLE 2

|  | 400 nm | 500 nm | 600 nm | 700 nm |
| --- | --- | --- | --- | --- |
| Transmittance in neutral state before high temperature (%) | 26.86 | 87.37 | 80.29 | 78.58 |
| Transmittance in neutral state after 4 days of high temperature (%) | 17.47 | 83.66 | 80.01 | 77.79 |
| Difference of the transmittance in neutral state (%) | <9 | <4 | <1 | <1 |
| Transmittance in colored state before high temperature (%) | 1.28 | 73.39 | 32.36 | 62.88 |
| Transmittance in colored state after 4 days of high temperature (%) | 0.41 | 68.47 | 26.38 | 59.6 |
| Difference of the transmittance in colored state (%) | <1 | <5 | <6 | <3 |

Figure 4:
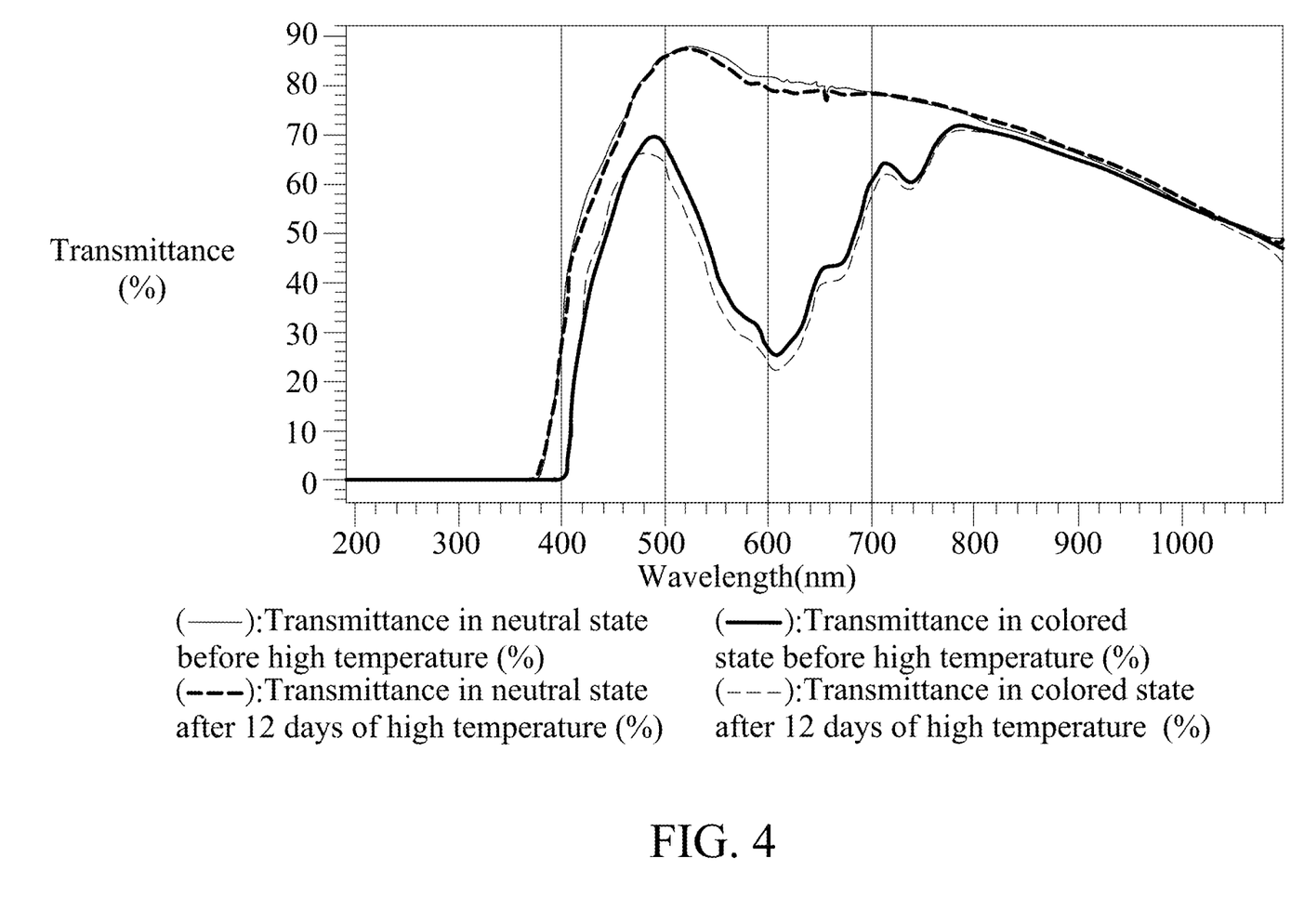

The transmission spectrum of device A3 is shown in FIG. 4, and the transmittance at different wavelengths in different states is shown in Table 3. From the results of the experiment, it can be found that, before the high-temperature cycling, there was a significant difference between the transmittance in the neutral state and the colored state of the device A3 at wavelengths in the visible light range. The compound A3, as an example, has a good transmittance contrast and is therefore suitable for the electrochromic field. Moreover, after the high-temperature cycling of device A3, there was no significant change in the transmittance in the neutral state, and the difference of the transmittance in the neutral state did not exceed 2%. There was also no significant change in the transmittance in the colored state, and the difference of the transmittances in the colored state did not exceed 4%. Therefore, there was no significant difference in the transmittance contrast of device A3 before and after high-temperature cycling, and compound A3 has good high-temperature reliability.

TABLE 3

|  | 400 nm | 500 nm | 600 nm | 700 nm |
| --- | --- | --- | --- | --- |
| Transmittance in neutral state before high temperature (%) | 29.41 | 85.82 | 81.47 | 78.61 |
| Transmittance in neutral state after 12 days of high temperature (%) | 27.48 | 85.98 | 79.52 | 78.33 |
| Difference of the transmittance in neutral state (%) | <2 | <1 | <2 | <1 |
| Transmittance in colored state before high temperature (%) | 0.34 | 67.67 | 26.82 | 60.09 |
| Transmittance in colored state after 12 days of high temperature (%) | 0.22 | 63.70 | 23.54 | 57.89 |
| Difference of the transmittance in colored state (%) | <0.2 | <4 | <4 | <3 |

Figure 5:
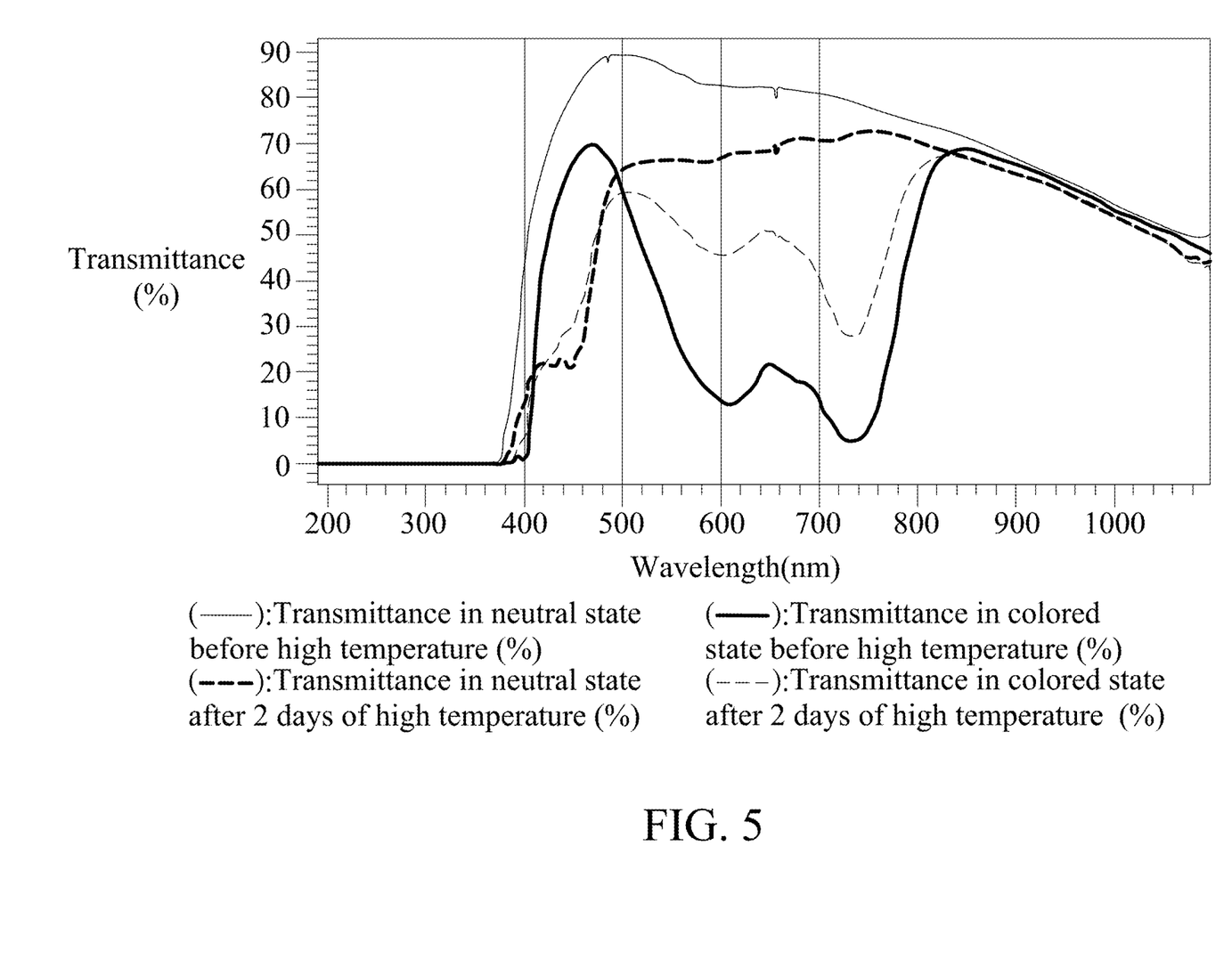
FIG. 5 shows the transmission spectrum of device B1 used as comparative example of the present disclosure in neutral and colored states.

The transmission spectrum of device B1 is shown in FIG. 5, and the transmittance of different wavelengths in different states is shown in Table 4. From the results of the experiment, it can be found that, before the high-temperature cycling, there was a significant difference between the transmittance in the neutral state and the colored state of the device B1 at wavelengths in the visible light range. The compound B1, as a comparative example, has a good transmittance contrast and is therefore suitable for the elec trochromic field. However, after the high-temperature cycling of device B1, the transmittance in the neutral state decreased significantly, and the difference of the transmittance in the neutral state all exceeded 10%. The transmittance in the colored state at wavelengths greater than 500 nm increased significantly, and its difference before and after high-temperature even exceeded 25%. Therefore, the transmittance contrast of device B1 after high-temperature cycling is poor, and compound B1 has poor high-temperature reliability.

TABLE 4

|  | 400 nm | 500 nm | 600 nm | 700 nm |
|---|---|---|---|---|
| Transmittance in neutral state before high temperature (%) | 41.89 | 89.57 | 82.71 | 80.92 |
| Transmittance in neutral state after 2 days of high temperature (%) | 14.41 | 64.49 | 66.92 | 70.74 |
| Difference of the transmittance in neutral state (%) | 27.4 | 25.5 | 15.8 | 10.2 |
| Transmittance in colored state before high temperature (%) | 0.862 | 59.883 | 13.881 | 13.996 |
| Transmittance in colored state after 2 days of high temperature (%) | 5.726 | 59.253 | 45.603 | 40.658 |
| Difference of the transmittance in colored state (%) | <5 | <1 | 31.72 | 26.66 |

Below, the differences in the transmittance in the visible light range of devices A1-A3 and B1 before and after high-temperature cycling were compared. Table 5 shows the maximum differences of the transmittance in the neutral state before and after high-temperature cycling of the devices, and Table 6 shows the maximum differences of the transmittance in the colored state before and after high-temperature cycling of the devices. Compounds A1-A3 containing thiadiazole functional group structures were used in devices A1-A3, respectively. Their transmittances in the neutral state and colored state before and after the high-temperature cycling were obviously not much different, and the differences were all within 10%. In contrast, compound B1 without a thiadiazole functional group structure was used in the device B1, and the maximum difference of the transmittance in the neutral state before and after high-temperature cycling was 27%, and the maximum difference of the transmittance in the colored state was 31%. It can be seen from the above experiments that in the present disclosure, by introducing thiadiazole into the triphenylamine structure, the durability and thermal stability of the material used in the electrochromic field can be increased.

TABLE 5

| Device | Maximum difference of the transmittances in the neutral state |
|---|---|
| Device A1 | <7% |
| Device A2 | <9% |
| Device A3 | <2% |
| Device B1 | 27.4% |

TABLE 6

| Device | Maximum difference of the transmittances in the colored state |
|---|---|
| Device A1 | <7% |
| Device A2 | <9% |
| Device A3 | <2% |
| Device B1 | 27.4% |

In summary, triphenylamine derivatives with new structures (such as compounds A1-A3) are obtained in the present disclosure by introducing thiadiazole into triphenylamine structure. For application in the field of electrochromism, in comparison with general triphenylamine compounds (such as compound B1), the triphenylamine derivatives in the present disclosure have better high-temperature thermal stability. Whether with electron-donating group or electron-withdrawing group attached to the aromatic ring, it has the effect of stability-increasing. In addition, compared with the triphenylamine polymer compounds commonly used in electrochromism field, the small-molecule triphenylamine derivatives used in the present disclosure are easier to synthesize and have lower costs.

The present disclosure is based on electrochromic technology and can be used in various aspects in future product applications, such as photochromic lenses, car windows, rearview mirrors, sunroofs, large-size smart window for buildings, etc. The present disclosure is not limited to liquid electrochromic systems, but can also be used in colloidal systems or solid systems.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electrochromic composition, comprising:
a first oxidizable compound with a concentration range of 0.01M-0.5M;
a reducible compound with a concentration range of 0.01M-0.5M;
an electrolyte with a concentration range of 0.01M-0.5M; and
a solvent,
wherein the first oxidizable compound is represented by the following formula:

wherein $X_1$, $X_2$ and $X_3$ are independently the same or different substituted or unsubstituted aromatic hydrocarbon group, wherein the aromatic hydrocarbon group includes the following:

2. The electrochromic composition claimed in claim 1, wherein the reducible compound is a viologen compound.

3. The electrochromic composition as claimed in claim 2, wherein the reducible compound is represented by the following formula:

wherein $R_1$ is a C1-C16 alkyl group.

4. The electrochromic composition as claimed in claim 1, wherein a molar ratio of the first oxidizable compound and the reducible compound is 1:0.01 to 1:50.

5. The electrochromic composition as claimed in claim 1, wherein the electrolyte comprises a lithium salt, an amine salt, a tetraalkylammonium salt, or an imidazolium salt.

6. The electrochromic composition as claimed in claim 1, further comprising:
a second oxidizable compound different from the first oxidizable compound.

7. The electrochromic composition as claimed in claim 1, further comprising:
a UV absorber, a UV blocker, an IR absorber, an IR blocker, or a combination thereof.

8. An electrochromic device, comprising:
a first transparent substrate having a first transparent conductive layer on one of its surfaces;
a second transparent substrate having a second transparent conductive layer on one of its surfaces, wherein the first transparent conductive layer is disposed opposite to the second transparent conductive layer;
an adhesive spacer, wherein the adhesive spacer is bonded between the first transparent conductive layer and the second transparent conductive layer, so that a closed space is formed among the first transparent substrate, the second transparent substrate, and the adhesive spacer; and
an electrochromic composition filled into the closed space, wherein the electrochromic composition is as claimed in claim 1.

9. The electrochromic device as claimed in claim 8, wherein a distance between the first transparent conductive layer and the second transparent conductive layer is 1 μm to 300 μm.

10. The electrochromic device as claimed in claim 8, wherein the adhesive spacer comprises a filler and an adhesive.

11. The electrochromic device as claimed in claim 10, wherein the adhesive includes a thermosetting adhesive, a light-curing adhesive, or a combination thereof.

12. The electrochromic device as claimed in claim 10, wherein the filler includes plastic, glass beads, sand powder, or a combination thereof.

* * * * *